US009458887B2

(12) United States Patent
Kaneko et al.

(10) Patent No.: US 9,458,887 B2
(45) Date of Patent: Oct. 4, 2016

(54) SYNTHETIC RESIN-MADE THRUST SLIDING BEARING

(71) Applicant: OILES CORPORATION, Tokyo (JP)

(72) Inventors: Ryohei Kaneko, Kanagawa (JP); Masaya Kinjyo, Kanagawa (JP); Yoshiaki Furusawa, Kanagawa (JP)

(73) Assignee: OILES CORPORATION, Tokyo (JP)

( * ) Notice: Subject to any disclaimer, the term of this patent is extended or adjusted under 35 U.S.C. 154(b) by 0 days.

(21) Appl. No.: 14/881,814

(22) Filed: Oct. 13, 2015

(65) Prior Publication Data

US 2016/0032978 A1 Feb. 4, 2016

Related U.S. Application Data

(62) Division of application No. 13/056,407, filed as application No. PCT/JP2009/003465 on Jul. 23, 2009, now Pat. No. 9,188,153.

(30) Foreign Application Priority Data

Jul. 28, 2008 (JP) ................................. 2008-194078

(51) Int. Cl.
*F16C 17/04* (2006.01)
*F16C 33/74* (2006.01)
(Continued)

(52) U.S. Cl.
CPC .............. *F16C 33/74* (2013.01); *B60G 15/068* (2013.01); *F16C 17/04* (2013.01); *F16C 33/20* (2013.01);
(Continued)

(58) Field of Classification Search
CPC ........ F16C 17/04; F16C 33/20; F16C 33/74; F16C 2326/05; F16C 2361/53; B60G 15/068; B60G 2204/128; B60G 2204/418; B60G 2206/7104

USPC ....... 384/123, 125, 129, 144, 297, 299, 300, 384/420, 422, 425, 607, 124, 397
See application file for complete search history.

(56) References Cited

U.S. PATENT DOCUMENTS 3,235,317 A * 2/1966 Cunningham ........ F16C 27/063
384/408
4,854,745 A * 8/1989 Kamimura ........... B60G 15/068
384/124

(Continued)

FOREIGN PATENT DOCUMENTS

DE 102005054113 A1 * 5/2007 ............... B62D 7/18
DE 102010027610 A1 * 1/2012 ............... F16C 17/04

(Continued)

OTHER PUBLICATIONS

European Search Report in EP 09 80 2664 dated Dec. 21, 2011.

(Continued)

*Primary Examiner* — Marcus Charles
(74) *Attorney, Agent, or Firm* — Nixon & Vanderhye P.C.

(57) ABSTRACT

A synthetic resin-made thrust sliding bearing 1 includes a synthetic resin-made upper casing 100, a synthetic resin-made lower casing 200, and a synthetic resin-made thrust bearing piece 300 interposed between the upper and lower casings 100 and 200. If it is assumed that the radial length of the thrust bearing piece 300 up to its outer peripheral surface 303 is (r), and the thickness of an upper annular plate portion 102 at its inner peripheral surface is (t), the upper casing 100 has on its upper surface 108 an annular flat surface 109 having a circular outer peripheral edge with R in a range of $R=r\pm t$.

6 Claims, 6 Drawing Sheets

(51) Int. Cl.
*F16C 33/20* (2006.01)
*B60G 15/06* (2006.01)

(52) U.S. Cl.
CPC ... *B60G 2204/128* (2013.01); *B60G 2204/418* (2013.01); *B60G 2206/7104* (2013.01); *F16C 2326/05* (2013.01); *F16C 2361/53* (2013.01)

(56) References Cited

U.S. PATENT DOCUMENTS

| | | | | |
|---|---|---|---|---|
| 4,969,752 | A * | 11/1990 | Kubota | B60G 15/068 384/124 |
| 5,476,326 | A * | 12/1995 | Ueno | B60G 15/067 384/125 |
| 6,918,701 | B2 | 7/2005 | Ueno et al. | |
| 7,273,317 | B2 * | 9/2007 | Miyata | B60G 15/068 384/420 |
| 7,293,918 | B2 * | 11/2007 | Watai | F16C 17/04 384/124 |
| 2004/0240761 | A1 * | 12/2004 | Watai | B60G 11/16 384/420 |
| 2006/0140523 | A1 * | 6/2006 | Miyata | B60G 15/068 384/420 |
| 2006/0215944 | A1 | 9/2006 | Watai et al. | |
| 2007/0170684 | A1 | 7/2007 | Ohkita et al. | |
| 2007/0237439 | A1 | 10/2007 | Watai et al. | |
| 2008/0310780 | A1 | 12/2008 | Watai et al. | |
| 2009/0180719 | A1 | 7/2009 | Miyata et al. | |
| 2011/0135228 | A1 | 6/2011 | Kaneko et al. | |

FOREIGN PATENT DOCUMENTS

| | | | |
|---|---|---|---|
| EP | 1 548 303 | 6/2005 | |
| JP | 2-1532 | 1/1990 | |
| JP | 2-6263 | 2/1990 | |
| JP | 4-47445 | 11/1992 | |
| JP | 4-52488 | 12/1992 | |
| JP | 8-2500 | 1/1996 | |
| JP | 10 122233 | 5/1998 | |
| JP | 11-013767 | 1/1999 | |
| JP | 2001 027229 | 1/2001 | |
| JP | 2001-173658 | 6/2001 | |
| JP | WO 02068835 A1 * | 9/2002 | ............. F16C 17/10 |
| JP | 2004-176728 | 6/2004 | |
| JP | 2007-032617 | 2/2007 | |
| JP | 3887891 B2 * | 2/2007 | ............. F16C 33/74 |
| JP | 2007-154938 | 6/2007 | |
| JP | 2007 303613 | 11/2007 | |
| JP | 2008-014463 | 1/2008 | |
| JP | WO 2008114514 A1 * | 9/2008 | ........... B60G 15/068 |
| JP | 2008232304 A * | 10/2008 | |
| JP | 4318268 B2 * | 8/2009 | ............. F16C 17/04 |
| JP | 4329363 B2 * | 9/2009 | ............. F16C 17/04 |
| JP | 4337364 B2 * | 9/2009 | ............. F16C 17/04 |
| JP | WO 2009122746 A1 * | 10/2009 | ........... B60G 11/15 |
| JP | WO 2009128252 A1 * | 10/2009 | ........... B60G 15/067 |
| JP | 4380177 B2 * | 12/2009 | ............. F16C 17/04 |
| WO | 2008/004338 | 1/2008 | |

OTHER PUBLICATIONS

International Search Report for PCT/JP2009/003465, mailed Aug. 25, 2009.

* cited by examiner

SYNTHETIC RESIN-MADE THRUST SLIDING BEARING

CROSS REFERENCE TO RELATED APPLICATIONS

This application is a divisional of U.S. application Ser. No. 13/056,407, filed Feb. 9, 2001, now U.S. Pat. No. 9,188,153, which is the U.S. National Phase of International Application No. PCT/JP2009/003465, filed Jul. 23, 2009, which designated the U.S and claims priority to Japanese Patent Application no. 2008-194078, filed Jul. 28, 2008, the entire contents of each of which are hereby incorporated by reference.

TECHNICAL FIELD

The present invention relates particularly to a synthetic resin-made thrust sliding bearing which is suitably incorporated as a thrust sliding bearing of a strut-type suspension (Macpherson type) in a four-wheeled motor vehicle.

BACKGROUND ART

In general, a strut-type suspension is mainly used in a front wheel of a four-wheeled motor vehicle, and is constructed such that a strut assembly incorporating a hydraulic shock absorber in an outer cylinder formed integrally with a main shaft is combined with a coil spring. Among such suspensions, there is a type of structure in which the axis of the coil spring is actively offset with respect to the axis of the strut, so as to allow the sliding of a piston rod of the shock absorber incorporated in the strut to be effected smoothly. There is another type of structure in which the coil spring is disposed by aligning the axis of the coil spring with the axis of the strut. In either structure, a bearing is disposed between a mounting member for a motor vehicle body and an upper spring seat of the coil spring to allow the rotation to be effected smoothly when the strut assembly rotates together with the coil spring by the steering operation.

In this thrust bearing, a rolling bearing using balls or needles or a synthetic resin-made sliding bearing is used. However, the rolling bearing has a possibility of causing a fatigue failure in the balls or needles owing to such as infinitesimal oscillations and a vibratory load, so that there is a problem in that it is difficult to maintain a smooth steering operation. As compared with the rolling bearing, the thrust sliding bearing has a high frictional torque and therefore has the problem that the steering operation is made heavy. Furthermore, both bearings have the problem that the steering operation is made heavy due to the high frictional force of a dust seal formed of a rubber elastomer fitted to prevent the ingress of foreign objects such as dust onto sliding surfaces, and the synthetic resin-made sliding bearing in particular has the problem that the steering operation is made much heavier.

To overcome the above-described problems, the present applicant proposed synthetic resin-made thrust sliding bearings which are each comprised of a synthetic resin-made upper casing, a synthetic resin-made lower casing, and a synthetic resin-made bearing piece interposed between the upper and lower casings, wherein the upper and lower casings are combined by elastic fitting, and a resiliently fitting portion and a sealing portion based on labyrinth action are respectively formed between the upper and lower casings and between an inner peripheral surface side and an outer peripheral surface side, to prevent the entry of foreign objects such as dust onto the bearing sliding surface by means of that sealing portion (described in Patent Document 1, Patent Document 2, Patent Document 3, Patent Document 4, and Patent Document 5).

This thrust bearing will be described with reference to drawings as follows. In FIGS. 12 and 13, a synthetic resin-made thrust sliding bearing 1 is disposed between a vehicle body-side mounting member X fixed to the vehicle body side by means of a mount insulator and a flat upper surface Q1 of an upper spring seat Q disposed in such a manner as to oppose a lower surface X1 of the vehicle body-side mounting member X and surround an outer peripheral surface P1 of a piston rod P fixed at its one end to the vehicle body-side mounting member X. This synthetic resin-made thrust sliding bearing 1 is comprised of a synthetic resin-made upper casing 100, a synthetic resin-made lower casing 200, and a synthetic resin-made bearing piece 30 interposed between the upper and lower casings 10 and 20. The upper casing 10 includes: an annular plate portion 12 having a circular hole 11 in its central portion, a cylindrical suspended portion 14 formed integrally with a lower surface 13 of the annular plate portion 12 in such a manner as to be radially outwardly spaced apart a predetermined interval from a peripheral edge of the circular hole 11; a cylindrical engaging suspended portion 16 formed integrally at an outer peripheral edge of the annular plate portion 12 in such a manner as to be radially outwardly spaced apart a predetermined interval from the cylindrical suspended portion 14, so as to form an annular groove 15 in cooperation with the cylindrical suspended portion 14; and an engaging hook portion 17 formed on an inner peripheral surface of an end portion of the cylindrical engaging suspended portion 16. The lower casing 20 includes: an annular plate portion 22 having in a central portion thereof an insertion hole 21 communicating with the circular hole 11 of the upper casing 10; an annular projection 23 having an inside diameter identical to that of the insertion hole 21 and formed integrally on an upper surface of the annular plate portion 22; an annular projection 25 formed integrally on the upper surface of the annular plate portion 22 in such a manner as to be radially outwardly spaced apart a predetermined interval from the annular projection 23, so as to form an annular recess 24 in cooperation with the annular projection 23 and the upper surface of the annular plate portion 22; a cylindrical engaging projecting portion 27 formed integrally at an outer peripheral edge of the annular plate portion 22 in such a manner as to be radially outwardly spaced apart a predetermined interval from the annular projection 25, so as to form an annular groove 26 in cooperation with the annular projection 25; an engaged portion 28 formed on an outer peripheral surface of the cylindrical engaging projecting portion 27; and a cylindrical portion 29 having an inside diameter identical to that of the insertion hole 21 and formed integrally on the lower surface of the lower casing 20. The upper casing 10 is combined with the lower casing 20 by causing the engaging hook portion 17 to be resiliently fitted to the engaged portion 28 of the lower casing 20.

PRIOR ART DOCUMENTS

Patent Documents

[Patent Document 1] JP-UM-B-4-52488
[Patent Document 2] JP-UM-B-2-1532
[Patent Document 3] JP-UM-B-2-6263

[Patent Document 4] JP-UM-B-8-2500
[Patent Document 5] JP-UM-B-4-47445

SUMMARY OF THE INVENTION

Problems that the Invention is to Solve

With the synthetic resin-made thrust sliding bearing, it is possible to overcome the problem of an increase in the steering operating force caused by the dust seal formed of a rubber elastomer fitted between the sliding surfaces in such a manner as to surround the sliding surfaces, and it is possible to obtain a stable and smooth steering operating force by preventing as practically as possible the entry of foreign objects such as dust onto the sliding surfaces.

As for the synthetic resin-made thrust sliding bearing 1 disposed between the vehicle body-side mounting member X and the upper surface Q1 of the upper spring seat Q, in a case where a fluctuating load such as an inclination has acted on the vehicle body-side mounting member X, interference occurs at radially superposed portions of the cylindrical engaging suspended portion 14 of the upper casing 10 and the annular projection 25 and the cylindrical engaging projecting portion 27 of the lower casing 20, as well as at resiliently fitting portions of the engaging hook portion 17 of the cylindrical engaging suspended portion 16 of the upper casing 10 and the engaged portion 28 of the cylindrical engaging projecting portion 27 of the lower casing 20. As a result, problems occurred such as the deformation, damage, and breakage of the engaging portions. Further, problems were found in that as an excessive load is applied to the bearing piece 30 of the synthetic resin-made thrust sliding bearing 1 disposed between the upper and lower casings 10 and 20, a creep (cold flow) phenomenon is induced in the bearing piece 30, and a shift due to creep deformation of that bearing piece 30 takes place from original sliding through the bearing piece 30 to sliding between the upper and lower casings 10 and 20, causing a decline in the sliding characteristics such as an increase in the coefficient of friction and the deterioration of wear resistance.

As a result of conducting strenuous studies to overcome the above-described problems, it was found that even in the case where a fluctuating load such as an inclination has acted on the vehicle body-side mounting member X, the above-described problems can be overcome by specifying the position of contact of the upper surface of the upper casing of the synthetic resin-made thrust sliding bearing in contact with the lower surface of the vehicle body-side mounting member between the vehicle body-side mounting member and the upper spring seat between which the synthetic resin-made thrust sliding bearing is disposed, without causing interference at the superposed portions of the cylindrical engaging suspended portion 14 of the upper casing 10 and the annular projection 25 and the cylindrical engaging projecting portion 27 of the lower casing 20 and at resiliently fitting portions of the engaging hook portion 17 of the cylindrical engaging suspended portion 16 of the upper casing 10 and the engaged portion 28 of the cylindrical engaging projecting portion 27 of the lower casing 20. Further, it was found that even in the case where creep deformation has occurred in the bearing piece 30, it is possible to constantly allow sliding to be effected through the thrust bearing piece without undergoing a shift to sliding between the upper and lower casings 10 and 20, thereby making it possible to maintain the sliding characteristics such as low friction characteristics and wear resistance for extended periods of time.

The present invention has been devised on the basis of the above-described finding, and its object is to provide a synthetic resin-made thrust sliding bearing which is comprised of synthetic resin-made upper and lower casings and a synthetic resin-made thrust sliding bearing piece interposed between the upper and lower casings, and which, even in cases where a fluctuating load such as an inclination has acted on the vehicle body-side mounting member, permits smooth steering operation without causing interference between the upper casing and the lower casing, which would otherwise cause problems such as the deformation, damage, and breakage of the engaging portions, or which would apply an excessive load on the sliding bearing piece interposed between the upper and lower casings and cause plastic deformation thereof.

Means for Overcoming the Problems

A synthetic resin-made thrust sliding bearing in accordance with the present invention comprises: a synthetic resin-made upper casing including an upper annular plate portion having a circular hole in its central portion, a first cylindrical suspended portion formed integrally on a lower surface of the upper annular plate portion in such a manner as to be radially outwardly spaced apart a predetermined interval from an inner peripheral surface of the upper annular plate portion defining the circular hole, a cylindrical engaging suspended portion formed integrally on the lower surface of the upper annular plate portion at an outer peripheral edge thereof in such a manner as to be radially outwardly spaced apart a predetermined interval from the first cylindrical suspended portion, so as to form an upper outer annular groove in cooperation with the first cylindrical suspended portion, and an annular engaging portion formed on an inner peripheral surface of the cylindrical engaging suspended portion; a synthetic resin-made lower casing including a lower annular plate portion having in its central portion an insertion hole concentric with the circular hole of the upper annular plate portion, a first annular projection formed integrally on an upper surface of the lower annular plate portion on an inner peripheral side thereof, a second annular projection formed integrally on the upper surface of the lower annular plate portion in such a manner as to be radially outwardly spaced apart a predetermined interval from the first annular projection, so as to form at its inner peripheral surface a lower annular recess in cooperation with an outer peripheral surface of the first annular projection and the upper surface of the lower annular plate portion, a cylindrical engaging projecting portion formed integrally on the upper surface of the lower annular plate portion at the outer peripheral edge thereof in such a manner as to be radially outwardly spaced apart a predetermined interval from the second annular projection, so as to form at its inner peripheral surface a lower outer annular groove in cooperation with an outer peripheral surface of the second annular projection, and an annular engaged portion formed on an outer peripheral surface of the cylindrical engaging projecting portion; and a thrust bearing piece formed in a form of a synthetic resin-made annular disk, disposed in the lower annular recess, and having a circular hole in a central portion thereof, wherein the thrust bearing piece is disposed in the lower annular recess while maintaining an inner annular clearance between its inner peripheral surface defining the circular hole and an outer peripheral surface of the first annular projection and maintaining an outer annular clearance between its outer peripheral surface and an inner peripheral surface of the second annular projection, respectively, the thrust bearing piece being disposed in the lower annular recess such that its upper surface is positioned between an opening plane of the lower annular recess and the lower surface of the upper annular plate portion by being brought into sliding contact with the lower surface of the upper annular plate portion, and such that its lower surface is positioned by being brought into sliding contact with the upper surface of the lower annular plate portion defining a bottom surface of the lower annular recess, and wherein the upper casing is combined with the lower casing by disposing the first cylindrical suspended portion in the lower outer annular groove so as to be radially superposed on the second annular projection and the cylindrical engaging projecting portion, and by causing the engaging portion to be resiliently fitted to the engaged portion, the synthetic resin-made thrust sliding bearing characterized in that if it is assumed that a radial length from an axis of the upper casing to the outer peripheral surface of the thrust bearing piece disposed in the lower annular recess is (r), and a thickness of the upper annular plate portion at its inner peripheral surface is (t), the upper casing has on its upper surface an annular flat surface having a circular outer peripheral edge whose radius (R) with the axis of the upper casing set as a center is in a range of R=r±t, and that the synthetic resin-made thrust sliding bearing is disposed between a lower surface of a vehicle body-side mounting member and an upper surface of an upper spring seat opposing that lower surface, such that only the annular flat surface is brought into contact with the lower surface of the vehicle body-side mounting member.

According to the present invention, the upper casing has on its upper surface an annular flat surface which satisfies the above-described relational formula, and the synthetic resin-made thrust sliding bearing is disposed between the lower surface of a vehicle body-side mounting member and the upper surface of an upper spring seat, such that only the annular flat surface is brought into contact with the lower surface of the vehicle body-side mounting member, while, at its other portions, maintaining a space with respect to the lower surface of the vehicle body-side mounting member. Therefore, even in the case where a fluctuating load such as an inclination has acted on the vehicle body-side mounting member, interference does not occur at radially superposed portions of the first cylindrical suspended portion of the upper casing and the second annular projection and the cylindrical engaging projecting portion of the lower casing, as well as at resiliently fitting portions of the engaging portion of the cylindrical engaging suspended portion of the upper casing and the engaged portion of the cylindrical engaging projecting portion of the lower casing. Hence, problems such as the deformation, damage, breakage, and the like do not occur in these superposed portions and resiliently fitting portions.

In the annular flat surface having a circular outer peripheral edge of a length smaller than the length of R=r−t in the above described formula, an excessive load would be applied to the thrust bearing piece in the synthetic resin-made thrust sliding bearing, and would cause creep and the like in the thrust bearing piece, resulting in a decline in low friction characteristics and wear resistance. On the other hand, in the annular flat surface having a circular outer peripheral edge of a length greater than the length of R=r+t, in the case where a fluctuating load such as an inclination has acted on the vehicle body-side mounting member, interference can possibly occur at the radially superposed portions of the first cylindrical suspended portion of the upper casing and the second annular projection and the cylindrical engaging projecting portion of the lower casing, as well as at the resiliently fitting portions of the engaging portion of the cylindrical engaging suspended portion of the upper casing and the engaged portion of the cylindrical engaging projecting portion of the lower casing. Hence, problems such as the deformation, damage, breakage, and the like can possibly occur in these superposed portions and resiliently fitting portions. Accordingly, the annular flat surface which is formed on the upper surface of the upper casing has a circular outer peripheral edge of a length whose radius (R) with the axis of the upper casing set as a center is in a range of R=r±t, preferably a circular outer peripheral edge of a length whose radius (R) is R=r.

In addition, according to the synthetic resin-made thrust sliding bearing in accordance with the above-described aspect, the upper casing is combined with the lower casing by disposing the first cylindrical suspended portion in the lower outer annular groove so as to be radially superposed on the second annular projection and the cylindrical engaging projecting portion, and by causing the engaging portion to be resiliently fitted to the engaged portion. Therefore, sealed portions based on the labyrinth action are formed at the radially superposed portions of the first cylindrical suspended portion and the second annular projection and the cylindrical engaging projecting portion and at the resiliently fitting portions of the engaging portion and the engaged portion, with the result that an operational effect is further added in that the entry of foreign objects such as dust between the upper and lower casings can be prevented.

In the synthetic resin-made thrust sliding bearing in accordance with the present invention, the annular flat surface may be constituted by an upper surface of the upper annular plate portion. However, in a case where the upper casing further has an annular projecting portion projecting in an axial direction integrally from the upper surface of the upper annular plate portion, the annular flat surface may be constituted by the upper surface of the annular projecting portion. Further, the upper casing may have on its upper surface a truncated conical surface with a descending gradient extending from an outer peripheral edge of the annular flat surface or from a radially outer portion of that outer peripheral edge to its outer peripheral surface.

According to the synthetic resin-made thrust sliding bearing in accordance with the above-described aspects, it is possible to more reliably avoid the interference at the radially superposed portions of the first cylindrical suspended portion of the upper casing and the second annular projection and the cylindrical engaging projecting portion of the lower casing and at the resiliently fitting portions of the engaging portion of the cylindrical engaging suspended portion of the upper casing and the engaged portion of the cylindrical engaging projecting portion of the lower casing in the case where a fluctuating load such as an inclination has acted on the vehicle body-side mounting member.

In the synthetic resin-made thrust sliding bearing in accordance with the present invention, the upper casing may further have a second cylindrical suspended portion which is radially outwardly adjacent to the circular hole in the central portion of the upper annular plate portion via an annular shoulder portion, and is formed integrally on the lower surface of the upper annular plate portion in such a manner as to be radially inwardly spaced apart a predetermined interval from an inner peripheral surface of the first cylindrical suspended portion, so as to form at its outer peripheral surface an upper annular recess in cooperation with the inner peripheral surface of the first cylindrical suspended portion and the lower surface of the upper annular plate portion.

Additionally, the lower casing may further have a third annular projection which has an inside diameter identical to that of the insertion hole formed in the central portion of the lower annular plate portion and is formed integrally on the upper surface of the lower annular plate portion in such a manner as to be radially inwardly spaced apart a predetermined interval from the first annular projection, so as to form at its outer peripheral surface a lower inner annular groove in cooperation with the inner peripheral surface of the first annular projection. In such an upper casing and a lower casing, the upper casing may be combined with the lower casing by disposing the second cylindrical suspended portion in the lower inner annular groove so as to be radially superposed on the first annular projection and the third annular projection.

According to the synthetic resin-made thrust sliding bearing in accordance with the above-described aspects, since the upper casing is combined with the lower casing by disposing the second cylindrical suspended portion in the lower inner annular groove so as to be radially superposed on the first annular projection and the third annular projection, sealed portions based on the labyrinth action are further formed at the radially superposed portions of the second cylindrical suspended portion and the first annular projection and the third annular projection. As a result, an operational effect is added in that the entry of foreign objects such as dust between the upper and lower casings, particularly from the inner peripheral surface side of the upper and lower casings, can be further prevented.

In the synthetic resin-made thrust sliding bearing in accordance with the present invention, the upper casing may further have a second cylindrical suspended portion which has an inside diameter identical to that of the insertion hole in the central portion of the upper annular plate portion and is formed integrally on the lower surface of the upper annular plate portion and a third cylindrical suspended portion formed integrally on the lower surface of the upper annular plate portion in such a manner as to be radially outwardly spaced apart a predetermined interval from an outer peripheral surface of the second cylindrical suspended portion, so as to form at its inner peripheral surface an upper inner annular groove in cooperation with the outer peripheral surface of the second cylindrical suspended portion. Additionally, the lower casing may further have a third annular projection which is formed integrally on the upper surface of the lower annular plate portion in such a manner as to be radially outwardly spaced apart from the insertion hole in the central portion of the lower annular plate portion via an annular shoulder portion, and is disposed in such a manner as to be radially inwardly spaced apart a predetermined interval from the inner peripheral surface of the first annular projection, so as to form at its outer peripheral surface a lower inner annular groove in cooperation with the inner peripheral surface of the first annular projection. In such an upper casing and a lower casing, the upper casing may be combined with the lower casing by radially superposing the second cylindrical suspended portion on the third annular projection, by disposing the third annular projection in the upper inner annular groove, and by disposing the third cylindrical suspended portion in the lower inner annular groove so as to be radially superposed on the first annular projection and the third annular projection, respectively.

According to the synthetic resin-made thrust sliding bearing in accordance with the above-described aspect, since the upper casing is combined with the lower casing by radially superposing the second cylindrical suspended portion on the third annular projection, by disposing the third annular projection in the upper inner annular groove, and by disposing the third cylindrical suspended portion in the lower inner annular groove so as to be radially superposed on the first annular projection and the third annular projection, respectively, sealed portions based on the labyrinth action are formed at the radially superposed portions of the second and third cylindrical suspended portions, on the one hand, and the first annular projection and the third annular projection, on the other hand. As a result, an operational effect is added in that the entry of foreign objects such as dust between the upper and lower casings, particularly from the inner peripheral surface side of the upper and lower casings, can be further prevented.

In the synthetic resin-made thrust sliding bearing in accordance with the above-described aspects, if it is assumed that a diameter of the outer peripheral surface of the first annular projection is (c), a diameter of the inner peripheral surface of the second annular projection is (d), a diameter of the inner peripheral surface of the thrust sliding bearing piece is (a), a diameter of the outer peripheral surface of the thrust sliding bearing piece is (b), a depth of the lower annular recess corresponding to a distance from the bottom surface of the lower annular recess to the opening plane of the lower annular recess is (f), and a thickness of the thrust bearing piece is (e), then a sum A of volumes of the inner annular clearance and the outer annular clearance and a volume B of that portion of the thrust bearing piece which projects from the opening plane of the lower annular recess may be in a relationship of B>A shown by a following formula:

$$e(b^2-a^2)>f(d^2-c^2).$$

As the above-described relational formula is satisfied, an operational effect is added in that even in the case where creep deformation has occurred in the thrust bearing piece of the synthetic resin-made thrust sliding bearing interposed between the upper and lower casings, it is possible to constantly allow sliding to be effected through the thrust bearing piece without undergoing a shift to sliding between the upper and lower casings, thereby making it possible to maintain the sliding characteristics such as low friction characteristics and wear resistance for extended periods of time.

In the synthetic resin-made thrust sliding bearing in accordance with the above-described aspects, the thrust bearing piece may have on each of the upper and lower surfaces thereof an annular groove which surrounds the circular hole and a plurality of radial grooves each having one end open at the annular groove and another end open at the outer peripheral surface and arranged in a circumferential direction. Further, the lower casing may have a cylindrical portion formed integrally on the lower surface of the lower annular plate portion and having an inside diameter identical to that of the insertion hole.

According to the synthetic resin-made thrust sliding bearing which has the cylindrical portion formed integrally on the lower surface of the lower annular plate portion and having an inside diameter identical to that of the insertion hole, the mounting of the synthetic resin-made thrust sliding bearing to the mounting member can be effected by inserting the cylindrical portion into a mounting hole formed in the mounting member, so that the mounting operation can be highly simplified.

Advantages of the Invention

According to the present invention, if it is assumed that the radial length from the axis of the upper casing to the outer peripheral surface of the thrust bearing piece disposed in the lower annular recess is (r), and the thickness of the upper annular plate portion at its inner peripheral surface is (t), the upper casing has on its upper surface the annular flat surface having a circular outer peripheral edge whose radius (R) with the axis of the upper casing set as a center is in a range of R=r±t, and the upper casing is disposed by being brought at only its annular flat surface into contact with the lower surface of the vehicle body-side mounting member. Since the synthetic resin-made thrust sliding bearing having this upper casing is disposed between the lower surface of the vehicle body-side mounting member and the upper surface of the upper spring seat, it is possible to provide a synthetic resin-made thrust sliding bearing in which, even in cases where a fluctuating load such as an inclination has acted on the vehicle body-side mounting member, interference does not occur at the radially superposed portions of the cylindrical suspended portion of the upper casing and the second annular projection and the cylindrical engaging projecting portion of the lower casing and at the resiliently fitting portions of the engaging portion of the cylindrical engaging suspended portion and the engaged portion of the cylindrical engaging projecting portion, thereby making it possible to prevent the occurrence of problems such as the deformation, damage, breakage, and the like in these superposed portions and resiliently fitting portions.

MODE FOR CARRYING OUT THE INVENTION

Figure 1:
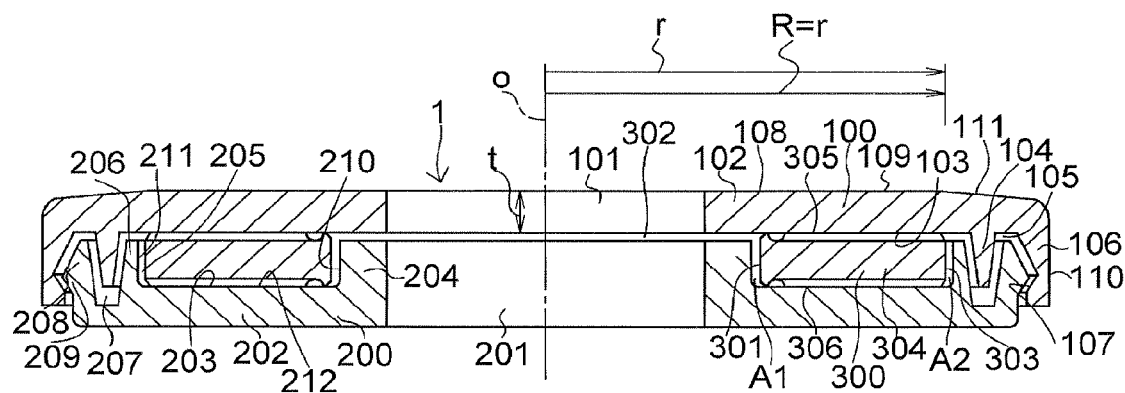
FIG. 1 is a cross-sectional view of a preferred first embodiment of the invention.

Hereafter, a more detailed description will be given of the present invention with reference to preferred embodiments shown in the drawings. It should be noted that the present invention is not limited to these embodiments.

Figure 2:
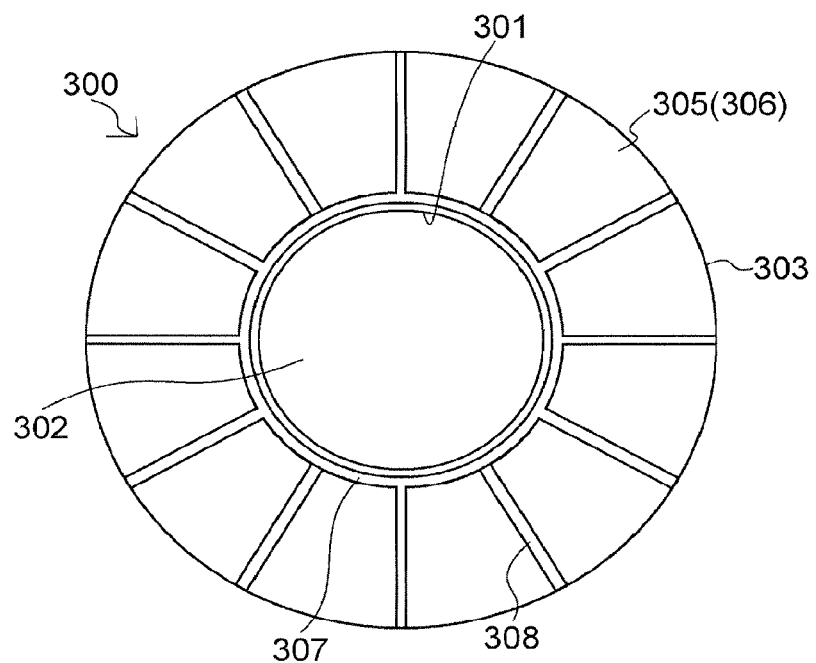
FIG. 2 is a plan view of a thrust bearing piece.
Figure 3:
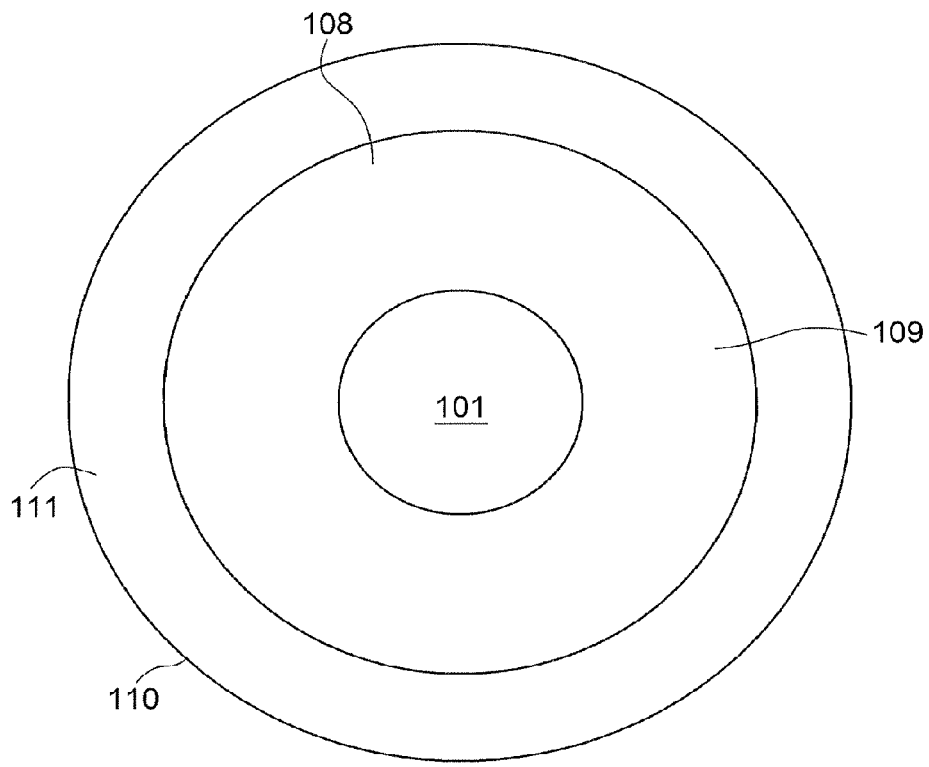
FIG. 3 is a plan view of an upper casing.

In FIGS. 1 to 3, a synthetic resin-made thrust sliding bearing 1 in accordance with a first embodiment of the invention is comprised of a synthetic resin-made upper casing 100, a synthetic resin-made lower casing 200, and a synthetic resin-made thrust bearing piece 300 interposed between the upper and lower casings 100 and 200.

The upper casing 100 includes an upper annular plate portion 102 having a circular hole 101 in its central portion; a cylindrical suspended portion 104 formed integrally on a lower surface 103 of the upper annular plate portion 102 in such a manner as to be radially outwardly spaced apart a predetermined interval from an inner peripheral surface of the upper annular plate portion 102 defining the circular hole 101; a cylindrical engaging suspended portion 106 formed integrally on the lower surface 103 of the upper annular plate portion 102 at an outer peripheral edge thereof in such a manner as to be radially outwardly spaced apart a predetermined interval from the cylindrical suspended portion 104, so as to form an upper outer annular groove 105 in cooperation with the cylindrical suspended portion 104; and an engaging portion 107 formed on an inner peripheral surface of the cylindrical engaging suspended portion 106.

The lower casing 200 includes a lower annular plate portion 202 having in its central portion an insertion hole 201 concentric with the circular hole 101; an annular projection 204 having an inside diameter identical to that of the insertion hole 201 and formed integrally on an upper surface 203 of the lower annular plate portion 202; an annular projection 206 formed integrally on the upper surface 203 of the lower annular plate portion 202 in such a manner as to be radially outwardly spaced apart a predetermined interval from the annular projection 204, so as to form at its inner peripheral surface a lower annular recess 205 in cooperation with an outer peripheral surface of the annular projection 204 and the upper surface 203 of the lower annular plate portion 202; a cylindrical engaging projecting portion 208 formed integrally on the upper surface 203 of the lower annular plate portion 202 at an outer peripheral edge thereof in such a manner as to be radially outwardly spaced apart a predetermined interval from the annular projection 206, so as to form at its inner peripheral surface a lower outer annular groove 207 in cooperation with an outer peripheral surface of the annular projection 206; and an annular engaged portion 209 formed on an outer peripheral surface of the cylindrical engaging projecting portion 208.

The thrust bearing piece 300 is constituted by a disk 304 which has in its central portion a circular hole 302 defined by an inner peripheral surface 301 having an inside diameter larger than the outside diameter of the outer peripheral surface of the annular projection 204 and has an outer peripheral surface 303 having an outside diameter smaller than the inside diameter of the annular projection 206. The thrust bearing piece 300 is disposed in the lower annular recess 205 while maintaining an inner annular clearance A1 between the inner peripheral surface 301 defining the circular hole 302 and an outer peripheral surface 210 of the annular projection 204 and maintaining an outer annular clearance A2 between the outer peripheral surface 303 and an inner peripheral surface 211 of the annular projection 206, respectively. Further, the thrust bearing piece 300 is disposed in the lower annular recess 205 such that its upper surface 305 is positioned between an opening plane of the lower annular recess 205 of the lower casing 200 and the lower surface 103 of the upper annular plate portion 102 by being brought into sliding contact with the lower surface 103 of the upper annular plate portion 102, and such that its lower surface 306 is positioned by being brought into sliding contact with the upper surface 203 of the lower annular plate portion 202 defining a bottom surface 212 of the lower annular recess 205.

As shown in FIG. 2, the thrust bearing piece 300 has on each of its upper and lower surfaces 305 and 306 an annular groove 307 which surrounds the circular hole 302, as well as a plurality of radial grooves 308 each having one end open at the annular groove 307 and the other end open at the outer peripheral surface 303 and arranged at equal intervals in the circumferential direction. A lubricant such as grease is filled in these annular grooves 307 and radial grooves 308.

The upper casing 100 is combined with the lower casing 200 by disposing an end portion of the cylindrical suspended portion 104 in the lower outer annular groove 207 so as to be radially superposed on end portions of the annular projection 206 and the cylindrical engaging projecting portion 208, and by causing the engaging portion 107 to be resiliently fitted to the engaged portion 209.

With the synthetic resin-made thrust sliding bearing 1, if it is assumed that the radial length from an axis (o) of the upper casing 100 to the outer peripheral surface 303 of the thrust bearing piece 300 disposed in the lower annular recess 205 is (r), and that the thickness of the upper annular plate portion 102 at its inner peripheral surface is (t), the upper casing 100 has, on an upper surface 108 of the upper annular plate portion 102 constituting its upper surface, an annular flat surface 109 having an outer peripheral edge whose radius (R) with the axis (o) of the upper casing 100 set as a center is in a range of $R=r\pm t$, as well as a truncated conical surface portion 111 with a descending gradient extending continuously from an outer peripheral edge of the annular flat surface 109 or from a radially outer portion of that outer peripheral edge to its outer peripheral surface 110.

Figure 4:
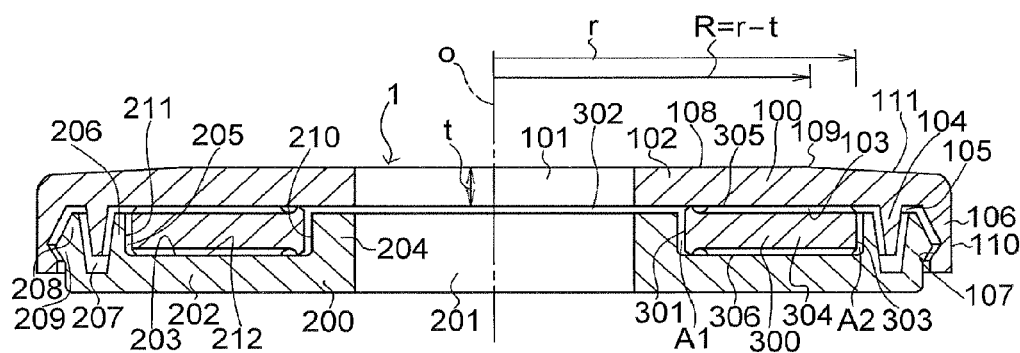
FIG. 4 is a cross-sectional view of a modification of the preferred first embodiment of the invention.
Figure 5:
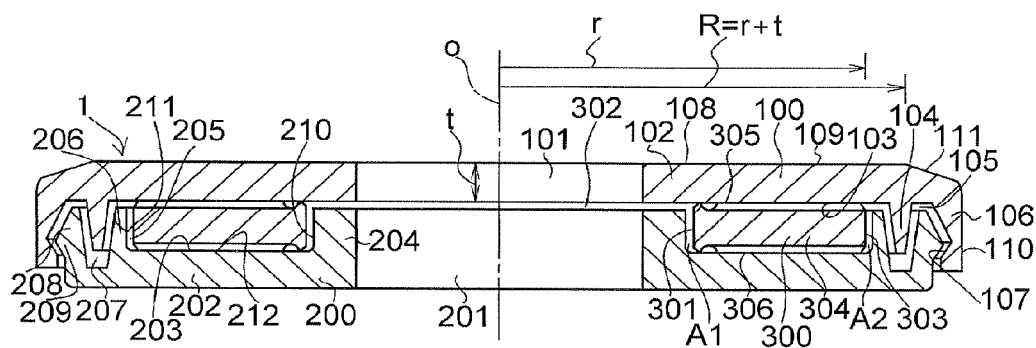
FIG. 5 is a cross-sectional view of another modification of the preferred first embodiment of the invention.

In this embodiment, as shown in FIG. 1, the upper casing 100 has, on the upper surface 108 of the upper annular plate portion 102 constituting its upper surface, the annular flat surface 109 having an outer peripheral edge whose radius (R) with the axis (o) of the upper casing 100 as a center is $R=r$. It should be noted that FIG. 4 shows an example in which the annular flat surface 109 having an outer peripheral edge whose radius (R) with the axis (o) of the upper casing 100 set as a center is $R=r-t$ is provided on the upper surface 108 of the upper annular plate portion 102, and FIG. 5 shows an example in which the annular flat surface 109 having an outer peripheral edge whose radius (R) with the axis (o) of the upper casing 100 set as a center is $R=r+t$ is provided on the upper surface 108 of the upper annular plate portion 102.

Figure 6:
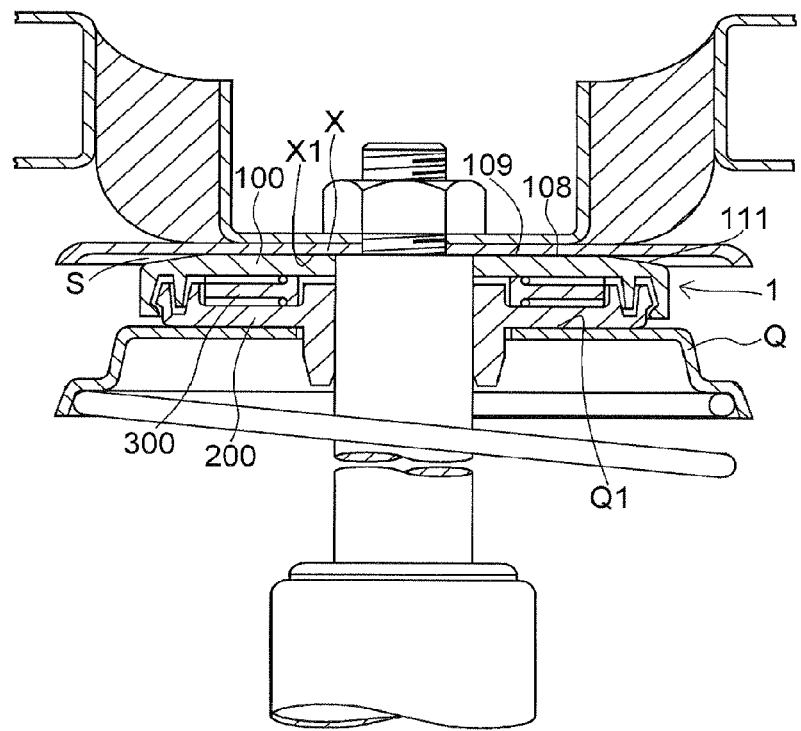
FIG. 6 is an explanatory diagram of an example in which the embodiment shown in FIG. 1 is incorporated in a strut-type suspension.

As shown in FIG. 6, the above-described synthetic resin-made thrust sliding bearing 1 is disposed between a lower surface X1 of a vehicle body-side mounting member X and an upper surface Q1 of an upper spring seat Q opposing that lower surface X1, such that only the annular flat surface 109 of the upper surface 108 of the upper annular plate portion 102 is brought into contact with the lower surface X1 of the vehicle body-side mounting member X, while, at its other portions, maintaining a space S with respect to the lower surface X1 of the vehicle body-side mounting member X. Therefore, even in the case where a fluctuating load such as an inclination has acted on the vehicle body-side mounting member X, interference does not occur at radially superposed portions of the cylindrical suspended portion 104 and the annular projection 206 and the cylindrical engaging projecting portion 208, as well as at resiliently fitting portions of the engaging portion 107 of the cylindrical engaging suspended portion 106 and the engaged portion 209 of the cylindrical engaging projecting portion 208. Hence, problems such as the deformation, damage, breakage, and the like do not occur in these superposed portions and resiliently fitting portions.

With the above-described synthetic resin-made thrust sliding bearing 1, the upper casing 100 is combined with the lower casing 200 by disposing the end portion of the cylindrical suspended portion 104 in the lower outer annular groove 207 so as to be radially superposed on the end portions of the annular projection 206 and the cylindrical engaging projecting portion 208, and by causing the engaging portion 107 to be resiliently fitted to the engaged portion 209. Therefore, sealed portions based on the labyrinth action are formed at the radially superposed portions of the cylindrical suspended portion 104 and the annular projection 206 and the cylindrical engaging projecting portion 208 and at the resiliently fitting portions of the engaging portion 107 and the engaged portion 209, with the result that an operational effect is added in that the entry of foreign objects such as dust between the upper and lower casings 100 and 200 can be prevented.

Figure 7:
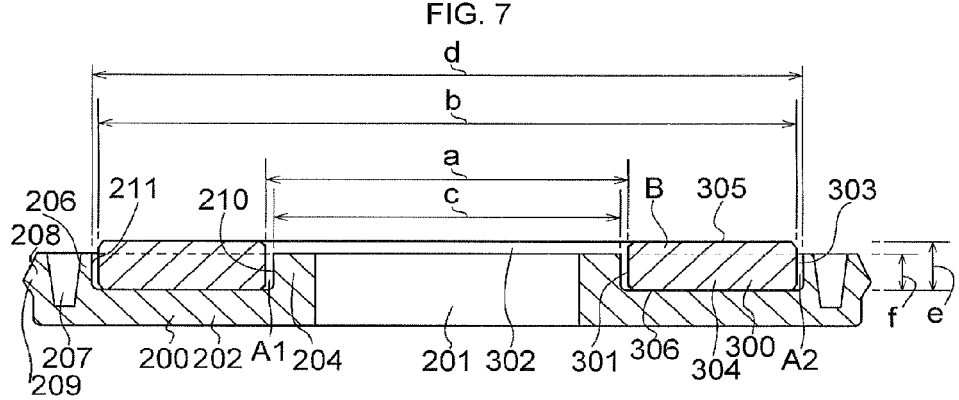
FIG. 7 is an explanatory diagram explaining the relationship between a lower casing and the thrust bearing piece in the embodiment of FIG. 1.
Figure 8:
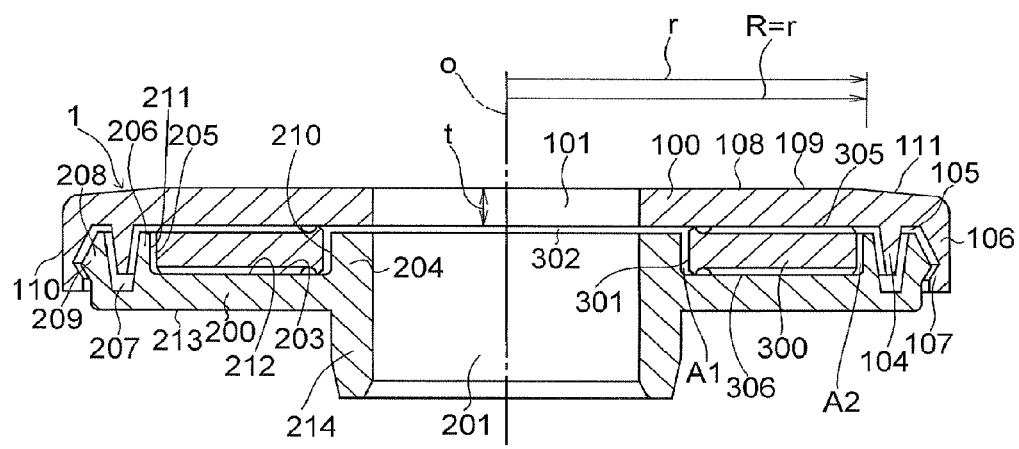
FIG. 8 is a cross-sectional view of a preferred second embodiment of the invention.

With the synthetic resin-made thrust sliding bearing 1, as shown in FIG. 7, if it is assumed that the diameter of the outer peripheral surface 210 of the annular projection 204 is c, the diameter of the inner peripheral surface 211 of the annular projection 206 is d, the diameter of the inner peripheral surface 301 of the thrust bearing piece 300 defining the circular hole 302 is a, the diameter of the outer peripheral surface 303 of the thrust bearing piece 300 is b, the depth of the lower annular recess 205 corresponding to the distance from the bottom surface of the lower annular recess 205 to the opening plane of the lower annular recess 205 is f, and the thickness of the thrust bearing piece 300 is e, then a sum A of volumes of the inner annular clearances A1 and A2 and a volume B of that portion of the thrust bearing piece 300 which projects upward from the opening plane of the lower annular recess 205 are preferably in a relationship of B>A, i.e., $e(b^2-a^2)>f(d^2-c^2)$ (refer to the below-described calculating formula). According to this arrangement, even in cases where a change (decrease) in the thickness due to creep deformation has occurred to the thrust bearing piece 300 in the lower annular recess 205, the change (decrease) in the thickness is restrained in the lower annular recess 205, and its further change (decrease) in the thickness is prevented. Further, since the upper surface 305 of the thrust bearing piece 300 constantly projects from the opening plane of the lower annular recess 205 of the lower casing 200, the upper and lower casings 100 and 200 can constantly be made to undergo sliding through the thrust bearing piece 300 without shifting to sliding between the upper and lower casings 100 and 200. Thus, an operational effect is added in that it is possible to maintain the sliding characteristics such as low friction characteristics and wear resistance over extended periods of time.

[Mathematical Formula 1]
(Calculating Formula)

Volume of inner annular clearance $A1=(a^2-c^2)\times\pi\cdot f/4$

Volume of outer annular clearance $A2=(d^2-b^2)\times\pi\cdot f/4$

Annular clearance $A\ (A1+A2)=(a^2-c^2+d^2-b^2)\times\pi\cdot f/4$

Volume B of the portion of the thrust bearing piece projecting upward from the opening plane of the lower annular recess $B=(b^2-a^2)\times\pi\cdot(e-f)/4$ From $B>A$, we have $e(b^2-a^2)>f(d^2-c^2)$.

As for the upper casing 100 and the lower casing 200, a thermoplastic synthetic resin such as polyacetal resin, polyamide resin, and polyester resin is suitably used. In addition, as the synthetic resin for forming the thrust bearing piece 300, a thermoplastic synthetic resin such as polyamide resin, polyolefin resin, and polyester resin, which excel in the sliding characteristics with respect to the thermoplastic synthetic resin for forming the upper casing 100 and the lower casing 200, is suitably used.

Figure 9:
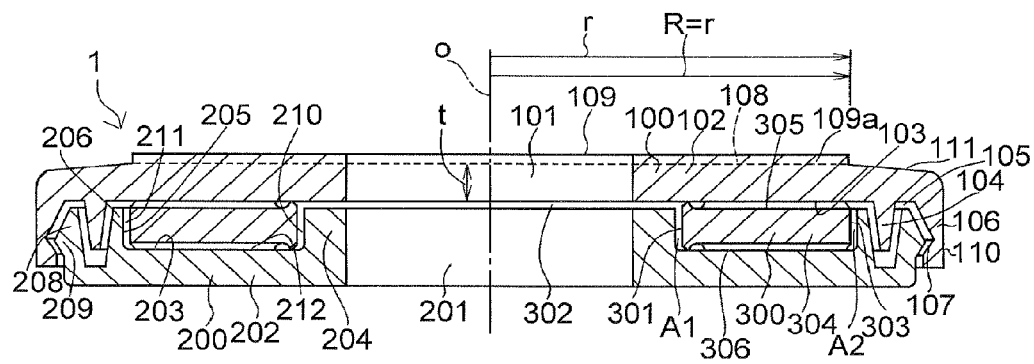
FIG. 9 is a cross-sectional view of a preferred third embodiment of the invention.

FIG. 9 shows the synthetic resin-made thrust sliding bearing 1 in accordance with a second embodiment, and this synthetic resin-made thrust sliding bearing 1 has, in addition to the construction of the synthetic resin-made thrust sliding bearing 1 in accordance with the first embodiment, a cylindrical portion 214 which has an inside diameter identical to that of the insertion hole 201 and is formed integrally with a lower surface 213 of the lower annular plate portion 202.

With the synthetic resin-made thrust sliding bearing 1 having the cylindrical portion 214 on the lower surface 213 of the lower casing 200, when it is installed between the upper spring seat Q of the coil spring and the vehicle body-side mounting member X to which a piston rod P is secured in a strut-type suspension assembly shown in FIG. 6, the installation operation is facilitated.

FIG. 9 shows the synthetic resin-made thrust sliding bearing 1 in accordance with a third embodiment. In the synthetic resin-made thrust sliding bearing 1 in accordance with the third embodiment, the upper casing 100 further has an annular projecting portion 109a projecting in the axial direction integrally from the upper surface 108 of the upper annular plate portion 102, the upper surface of the upper casing 100 is the upper surface of the annular projecting portion 109a, and the annular flat surface 109 is constituted by the upper surface of the annular projecting portion 109a. If the length to the outer peripheral surface 303 of the thrust bearing piece 300 disposed in the lower annular recess 205 is assumed to be (r), the annular flat surface 109 has an outer peripheral edge whose radius (R) with the axis (o) of the upper casing 100 set as a center is R=r, the annular projecting portion 109a being continuous from its outer peripheral surface to the truncated conical surface portion 111 with a descending gradient. The other arrangements of the synthetic resin-made thrust sliding bearing 1 in accordance with this third embodiment are similar to those of the synthetic resin-made thrust sliding bearing 1 in accordance with the first embodiment shown in FIG. 1. With the synthetic resin-made thrust sliding bearing 1 in accordance with such a third embodiment as well, if the thickness of the upper annular plate portion 102 at its inner peripheral surface is assumed to be (t), the annular flat surface 109, which is the upper surface of the upper casing 100, may have an outer peripheral edge with the radius (R) of R=r−t, or may have an outer peripheral edge with the radius (R) of R=r+t, i.e., may have an outer peripheral edge with the radius (R) in the range of R=r±t.

With the synthetic resin-made thrust sliding bearing 1 in accordance with the third embodiment as well, the sum A of volumes of the inner annular clearances A1 and A2 and the volume B of that portion of the thrust bearing piece 300 which projects upward from the opening plane of the lower annular recess 205 are preferably in the relationship of B>A, i.e., $e(b^2-a^2)>f(d^2-c^2)$.

According to the synthetic resin-made thrust sliding bearing 1 in accordance with the third embodiment, it is possible to more reliably avoid the interference at the radially superposed portions of the cylindrical suspended portion 104 and the annular projection 206 and the cylindrical engaging projecting portion 208 and at the resiliently fitting portions of the engaging portion 107 of the cylindrical engaging suspended portion 106 and the engaged portion 209 of the cylindrical engaging projecting portion 208 in the case where a fluctuating load such as an inclination has acted on the vehicle body-side mounting member X.

With the synthetic resin-made thrust sliding bearing 1 in accordance with the third embodiment, in the same way as with the synthetic resin-made thrust sliding bearing 1 in accordance with the first embodiment, sealed portions based on the labyrinth action are formed at the radially superposed portions of the cylindrical suspended portion 104 and the annular projection 206 and the cylindrical engaging projecting portion 208 and at the resiliently fitting portions of the engaging portion 107 and the engaged portion 209. As a result, an operational effect is added in that the entry of foreign objects such as dust between the upper and lower casings 100 and 200 can be prevented.

Also with the synthetic resin-made thrust sliding bearing 1 in accordance with the third embodiment, in the same way as the thrust bearing pieces 300 of the synthetic resin-made thrust sliding bearings 1 in accordance with the first and second embodiments, as shown in FIG. 2, the thrust bearing piece 300 should preferably have on each of its upper and lower surfaces 305 and 306 the annular groove 307 which surrounds the circular hole 302, as well as the plurality of radial grooves 308 each having one end open at the annular groove 307 and the other end open at the outer peripheral surface 303 of the disk 304 and arranged at equal intervals in the circumferential direction. A lubricant such as grease is filled in these annular grooves 307 and radial grooves 308.

Also with the synthetic resin-made thrust sliding bearing 1 in accordance with the third embodiment, in the same way as the upper casings 100, the lower casings 200, and the thrust bearing pieces 300 of the synthetic resin-made thrust sliding bearings 1 in accordance with the first and second embodiments, as for the upper casing 100 and the lower casing 200, a thermoplastic synthetic resin such as polyacetal resin, polyamide resin, and polyester resin is suitably used, and as the synthetic resin for forming the thrust bearing piece 300, a thermoplastic synthetic resin such as polyamide resin, polyolefin resin, and polyester resin, which excel in the sliding characteristics with respect to the thermoplastic synthetic resin for forming the upper casing 100 and the lower casing 200, is suitably used.

Figure 10:
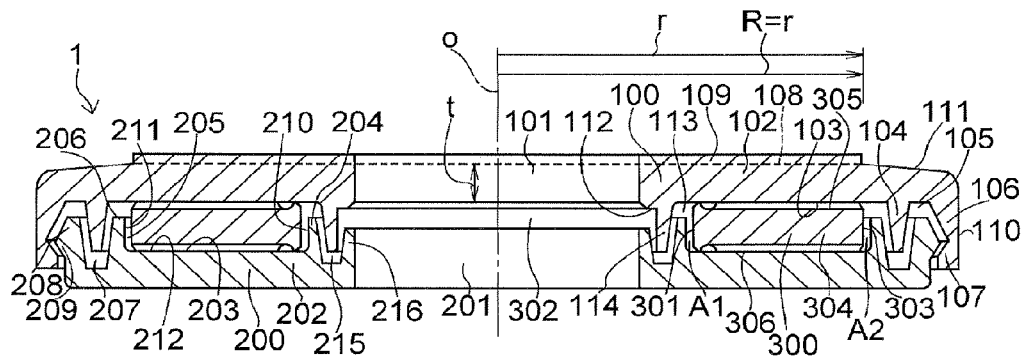
FIG. 10 is a cross-sectional view of a preferred fourth embodiment of the invention.

FIG. 10 shows the synthetic resin-made thrust sliding bearing 1 in accordance with a fourth embodiment. With this synthetic resin-made thrust sliding bearing 1, in the synthetic resin-made thrust sliding bearing 1 in accordance with the third embodiment, the upper casing 100 further has a cylindrical suspended portion 114 which is radially outwardly adjacent to the circular hole 101 in the central portion of the upper annular plate portion 102 via an annular shoulder portion 112, and is formed integrally on the lower surface 103 of the upper annular plate portion 102 in such a manner as to be radially inwardly spaced apart a predetermined interval from the inner peripheral surface of the cylindrical suspended portion 104, so as to form at its outer peripheral surface an upper annular recess 113 in cooperation with the inner peripheral surface of the cylindrical suspended portion 104 and the lower surface 103 of the upper annular plate portion 102. The lower casing 200 has an annular projection 216 which has an inside diameter identical to that of the insertion hole 201 formed in the central portion of the lower annular plate portion 202 and is formed integrally on the upper surface 203 of the lower annular plate portion 202 in such a manner as to be radially inwardly spaced apart a predetermined interval from the annular projection 204, so as to form at its outer peripheral surface a lower inner annular groove 215 in cooperation with the inner peripheral surface of the annular projection 204. The upper casing 100 is combined with the lower casing 200 by disposing the end portion of the cylindrical suspended portion 114 in the lower inner annular groove 215 so as to be radially superposed on the end portions of the annular projections 204 and 216.

Also with the synthetic resin-made thrust sliding bearing 1 in accordance with the fourth embodiment, in the same way as with the synthetic resin-made thrust sliding bearing 1 in accordance with the third embodiment, if the length to the outer peripheral surface 303 of the thrust bearing piece 300 disposed in the lower annular recess 205 is assumed to be (r), the annular flat surface 109 constituted by the upper surface of the annular projecting portion 109a has an outer peripheral edge whose radius (R) with the axis (o) of the upper casing 100 set as a center is R=r, the annular projecting portion 109a being continuous from its outer peripheral surface to the truncated conical surface portion 111 with a descending gradient. Also with the synthetic resin-made thrust sliding bearing 1 in accordance with this fourth embodiment, if the thickness of the upper annular plate portion 102 at its inner peripheral surface is assumed to be (t), the annular flat surface 109, which is the upper surface of the upper casing 100, may have an outer peripheral edge with the radius (R) in the range of R=r±t.

According to the synthetic resin-made thrust sliding bearing 1 in accordance with the fourth embodiment, it is possible to more reliably avoid the interference at the radially superposed portions of the cylindrical suspended portion 104 and the annular projection 206 and the cylindrical engaging projecting portion 208 and at the resiliently fitting portions of the engaging portion 107 and the engaged portion 209 in the case where a fluctuating load such as an inclination has acted on the vehicle body-side mounting member X.

With the synthetic resin-made thrust sliding bearing 1 in accordance with the fourth embodiment as well, the sum A of volumes of the inner annular clearances A1 and A2 and the volume B of that portion of the thrust bearing piece 300 which projects upward from the opening plane of the lower annular recess 205 are preferably in the relationship of B>A, i.e., $e(b^2-a_2) > f(d^2-c^2)$.

With the synthetic resin-made thrust sliding bearing 1 in accordance with the fourth embodiment, the upper casing 100 is combined with the lower casing 200 by disposing the end portion of the cylindrical suspended portion 114 in the lower inner annular groove 215 so as to be radially superposed on the end portions of the annular projection 216 and the annular projection 204, by disposing the end portion of the cylindrical suspended portion 104 in the lower outer annular groove 207 so as to be radially superposed on the end portions of the annular projection 206 and the cylindrical engaging projecting portion 208, and by causing the engaging portion 107 to be resiliently fitted to the engaged portion 209. Therefore, sealed portions based on the labyrinth action are formed at the radially superposed portions of the cylindrical suspended portion 114 and the annular projection 216 and the annular projection 204, at the radially superposed portions of the cylindrical suspended portion 104 and the annular projection 206 and cylindrical engaging projecting portion 208, and at the resiliently fitting portions of the engaging portion 107 and the engaged portion 209. As a result, an operational effect is added in that the entry of foreign objects such as dust between the upper and lower casings 100 and 200, particularly from the inner peripheral surface side of the upper and lower casings, is further prevented.

Also with the synthetic resin-made thrust sliding bearing 1 in accordance with the fourth embodiment, in the same way as the thrust bearing piece 300 of the synthetic resin-made thrust sliding bearing 1 in accordance with the first embodiment, as shown in FIG. 2, the thrust bearing piece 300 should preferably have on each of its upper and lower surfaces 305 and 306 the annular groove 307 which surrounds the circular hole 302, as well as the plurality of radial grooves 308 each having one end open at the annular groove 307 and the other end open at the outer peripheral surface 303 of the disk 304 and arranged at equal intervals in the circumferential direction. A lubricant such as grease is filled in these annular grooves 307 and radial grooves 308.

Also with the synthetic resin-made thrust sliding bearing 1 in accordance with the fourth embodiment, in the same way as the upper casing 100, the lower casing 200, and the thrust bearing piece 300 of the synthetic resin-made thrust sliding bearing 1 in accordance with the first embodiment, as for the upper casing 100 and the lower casing 200, a thermoplastic synthetic resin such as polyacetal resin, polyamide resin, and polyester resin is suitably used, and as the synthetic resin for forming the thrust bearing piece 300, a thermoplastic synthetic resin such as polyamide resin, polyolefin resin, and polyester resin, which excel in the sliding characteristics with respect to the thermoplastic synthetic resin for forming the upper casing 100 and the lower casing 200, is suitably used.

Figure 11:
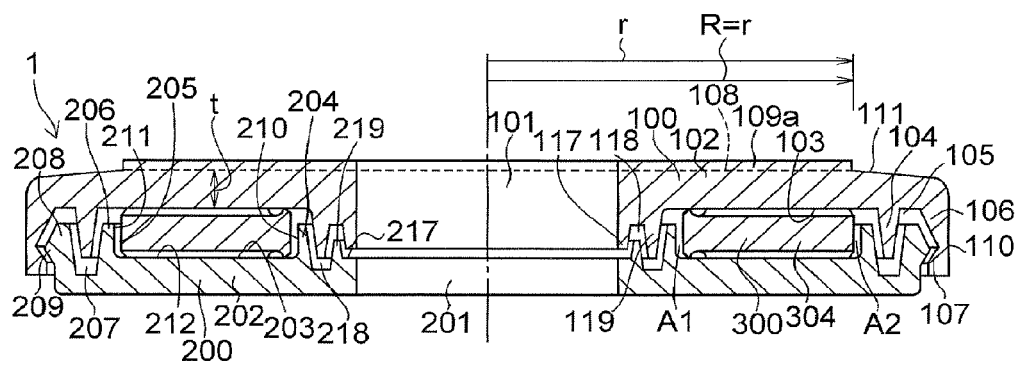
FIG. 11 is a cross-sectional view of a preferred fifth embodiment of the invention.
Figure 12:
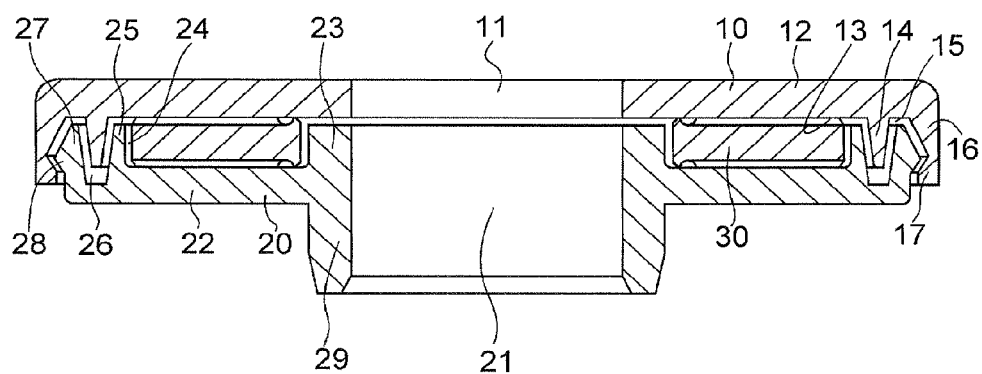
FIG. 12 is a cross-sectional view of a conventional synthetic resin-made thrust sliding bearing.
Figure 13:
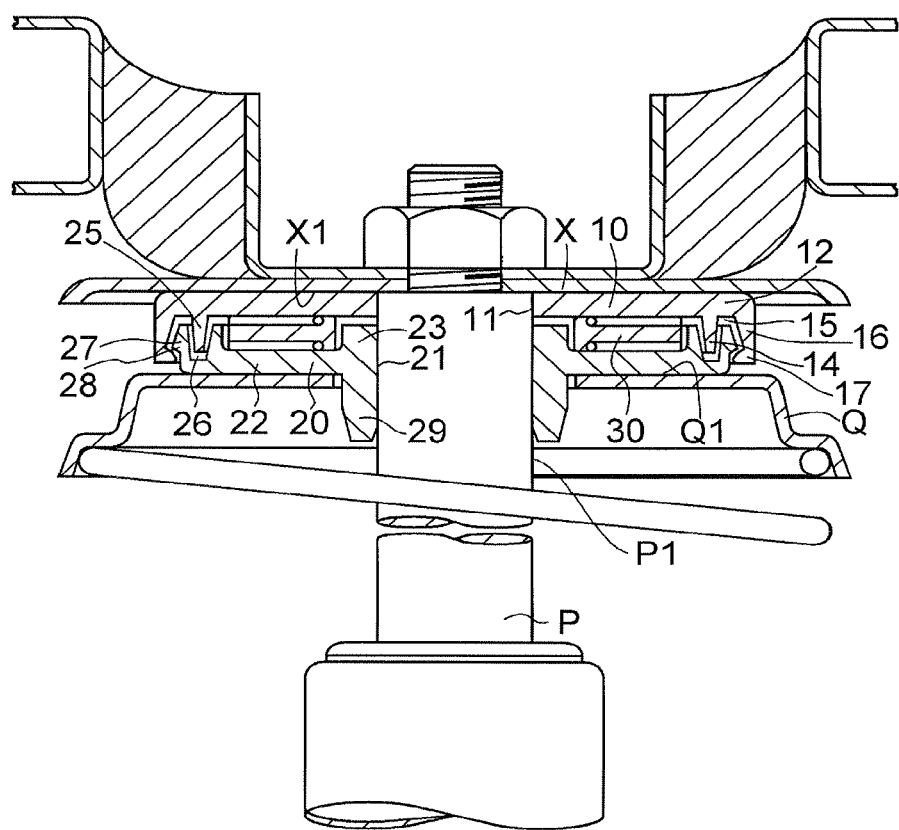
FIG. 13 is an explanatory diagram of an example in which the example shown in FIG. 12 is incorporated in the strut-type suspension.

FIG. 11 shows the synthetic resin-made thrust sliding bearing 1 in accordance with a fifth embodiment. With this synthetic resin-made thrust sliding bearing 1, in the synthetic resin-made thrust sliding bearing 1 in accordance with the third embodiment, the upper casing 100 further has a cylindrical suspended portion 117 which has an inside diameter identical to that of the circular hole 201 in the central portion of the upper annular plate portion 102 and is formed integrally on the lower surface 103 of the upper annular plate portion 102, as well as a cylindrical suspended portion 119 formed integrally on the lower surface 103 of the upper annular plate portion 102 in such a manner as to be radially outwardly spaced apart a predetermined interval from the outer peripheral surface of the cylindrical suspended portion 117, so as to form at its inner peripheral surface an upper inner annular groove 118 in cooperation with the outer peripheral surface of the cylindrical suspended portion 117. The lower casing 200 further has an annular projection 219 which is formed integrally on the upper surface 203 of the lower annular plate portion 202 in such a manner as to be radially outwardly spaced apart from the insertion hole 201 in the central portion of the lower annular plate portion 202 via an annular shoulder portion 217, and is disposed in such a manner as to be radially inwardly spaced apart a predetermined interval from the inner peripheral surface of the annular projection 204, so as to form at its outer peripheral surface a lower inner annular groove 218 in cooperation with the inner peripheral surface of the annular projection 204. The upper casing 100 is combined with the lower casing 200 by radially superposing the end portion of the cylindrical suspended portion 117 on the end portion of the annular projection 219, by disposing the end portion of the annular projection 219 in the upper inner annular groove 118, and by disposing the end portion of the cylindrical suspended portion 119 in the lower inner annular groove 218 so as to be radially superposed on the end portions of the annular projection 204 and the annular projection 219, respectively.

Also with the synthetic resin-made thrust sliding bearing 1 in accordance with this fifth embodiment, in the same way as with the synthetic resin-made thrust sliding bearings 1 in accordance with the third and fourth embodiments, if the length to the outer peripheral surface 303 of the thrust bearing piece 300 disposed in the lower annular recess 205 is assumed to be (r), the annular flat surface 109 constituted by the upper surface of the annular projecting portion 109a has an outer peripheral edge whose radius (R) with the axis (o) of the upper casing 100 set as a center is R=r, the annular projecting portion 109a being continuous from its outer peripheral surface to the truncated conical surface portion 111 with a descending gradient. Also with the synthetic resin-made thrust sliding bearing 1 in accordance with this fifth embodiment, if the thickness of the upper annular plate portion 102 at its inner peripheral surface is assumed to be (t), the annular flat surface 109, which is the upper surface of the upper casing 100, may have an outer peripheral edge with the radius (R) in the range of R=r±t.

According to the synthetic resin-made thrust sliding bearing 1 in accordance with the fifth embodiment, it is possible to more reliably avoid the interference at the radially superposed portions of the cylindrical suspended portion 104 and the annular projection 206 and the cylindrical engaging projecting portion 208 and at the resiliently fitting portions of the engaging portion 107 and the engaged portion 209 in the case where a fluctuating load such as an inclination has acted on the vehicle body-side mounting member X.

With the synthetic resin-made thrust sliding bearing 1 in accordance with the fifth embodiment as well, the sum A of volumes of the inner annular clearances A1 and A2 and the volume B of that portion of the thrust bearing piece 300 which projects from the opening of the lower annular recess 205 are preferably in the relationship of B>A, i.e., $e(b^2-a^2) > f(d^2-c^2)$.

With the synthetic resin-made thrust sliding bearing 1 in accordance with the fifth embodiment, the upper casing 100 is combined with the lower casing 200 by radially superposing the end portion of the cylindrical suspended portion 117 on the end portion of the annular projection 219, by disposing the end portion of the cylindrical suspended portion 119 in the lower inner annular groove 218 so as to be radially superposed on the end portions of the annular projection 219 and the annular projection 204, respectively, by disposing the end portion of the cylindrical suspended portion 104 in the lower outer annular groove 207 so as to be radially superposed on the end portions of the annular projection 206 and the cylindrical engaging projecting portion 208, respectively, and by causing the engaging portion 107 to be resiliently fitted to the engaged portion 209. Therefore, sealed portions based on the labyrinth action are formed at the superposed portions of the cylindrical suspended portion 117 and the annular projection 219, at the superposed portions of the cylindrical suspended portion 119 and the annular projection 219 and the annular projection 204, at the superposed portions of the cylindrical suspended portion 104 and the annular projection 206 and the cylindrical engaging projecting portion 208, and at the resiliently fitting portions of the engaging portion 107 and the engaged portion 209. As a result, an operational effect is added in that the entry of foreign objects such as dust between the upper and lower casings 100 and 200, particularly from the inner peripheral surface side of the upper and lower casings, can be further prevented.

Also with the synthetic resin-made thrust sliding bearing 1 in accordance with the fifth embodiment, in the same way as the thrust bearing piece 300 of the synthetic resin-made thrust sliding bearing 1 in accordance with the first embodiment, as shown in FIG. 2, the thrust bearing piece 300 should preferably have on each of its upper and lower surfaces 305 and 306 the annular groove 307 which surrounds the circular hole 302, as well as the plurality of radial grooves 308 each having one end open at the annular groove 307 and the other end open at the outer peripheral surface 303 of the disk 304 and arranged at equal intervals in the circumferential direction. A lubricant such as grease is filled in these annular grooves 307 and radial grooves 308.

Also with the synthetic resin-made thrust sliding bearing 1 in accordance with the fifth embodiment, in the same way as the upper casings 100, the lower casings 200, and the thrust bearing pieces 300 of the synthetic resin-made thrust sliding bearings 1 in accordance with the first to fourth embodiments, as for the upper casing 100 and the lower casing 200, a thermoplastic synthetic resin such as polyacetal resin, polyamide resin, and polyester resin is suitably used, and as the synthetic resin for forming the thrust bearing piece 300, a thermoplastic synthetic resin such as polyamide resin, polyolefin resin, and polyester resin, which excel in the sliding characteristics with respect to the thermoplastic synthetic resin for forming the upper casing 100 and the lower casing 200, is suitably used.

In the same way as the synthetic resin-made thrust sliding bearing 1 in accordance with the second embodiment, each of the synthetic resin-made thrust sliding bearings 1 in accordance with the third, fourth, and fifth embodiments may have, in addition to the above-described construction, the cylindrical portion 214 which has an inside diameter identical to that of the insertion hole 201 and is formed integrally with the lower surface 213 of the lower annular plate portion 202 of the lower casing 200.

As described above, in the synthetic resin-made thrust sliding bearing in accordance with the present invention, it is possible to more reliably avoid the interference at the radially superposed portions of the cylindrical suspended portion 104 and the annular projection 206 and the cylindrical engaging projecting portion 208 and at the resiliently fitting portions of the engaging portion 107 and the engaged portion 209 even in the case where a fluctuating load such as an inclination has acted on the vehicle body-side mounting member.

In the synthetic resin-made thrust sliding bearing in accordance with the invention in which the sum A of the volumes of the inner annular clearance A1 and the outer annular clearance A2 and the volume B of that portion of the thrust bearing piece which projects upward from the opening plane of the lower annular recess are in the relationship of B>A, i.e., $e(b^2-a^2) > f(d^2-c^2)$, even in cases where a change (decrease) in the thickness due to creep deformation has occurred to the thrust bearing piece in the lower annular recess, the change (decrease) in the thickness is restrained in the lower annular recess, and its further change (decrease) in the thickness is prevented. Further, since the upper surface of the thrust bearing piece constantly projects from the opening plane of the lower annular recess of the lower casing, the upper and lower casings can constantly be made to undergo sliding through the thrust bearing piece without shifting to sliding between the upper and lower casings. Thus, an operational effect is added in that it is possible to maintain the sliding characteristics such as low friction characteristics and wear resistance for extended periods of time.

The invention claimed is:

1. A synthetic resin-made thrust sliding bearing comprising:
- a synthetic resin-made upper casing including an upper annular plate portion having a circular hole in its central portion;
- a synthetic resin-made lower casing including a lower annular plate portion having in its central portion an insertion hole concentric with the circular hole of said upper annular plate portion; and
- a thrust bearing piece formed in a form of a synthetic resin-made annular disk and having a circular hole in a central portion thereof,
- wherein if it is assumed that a radial length from an axis of said upper casing to the outer peripheral surface of said thrust bearing piece is (r), and a thickness of said upper annular plate portion at its inner peripheral surface is (t), said upper casing has on its upper surface an annular flat surface having a circular outer peripheral edge whose radius (R) with the axis of said upper casing set as a center is in a range of $R=r-t$.

2. The synthetic resin-made thrust sliding bearing according to claim 1, wherein the upper surface of said upper casing is an upper surface of said upper annular plate portion.

3. The synthetic resin-made thrust sliding bearing according to claim 1, wherein said upper casing further has an annular projecting portion projecting in an axial direction integrally from an upper surface of said upper annular plate portion, the upper surface of said upper casing is an upper surface of said annular projecting portion, and the annular flat surface is constituted by the upper surface of said annular projecting portion.

4. The synthetic resin-made thrust sliding bearing according to claim 1, wherein said upper casing has on its upper surface a truncated conical surface portion with a descending gradient extending from an outer peripheral edge of the annular flat surface or from a radially outer portion of that outer peripheral edge to its outer peripheral surface.

5. The synthetic resin-made thrust sliding bearing according to claim 1, wherein said thrust bearing piece has on each of an upper surface and a lower surface thereof an annular groove which surrounds the circular hole and a plurality of radial grooves each having one end open at the annular groove and another end open at the outer peripheral surface and arranged in a circumferential direction.

6. The synthetic resin-made thrust sliding bearing according to claim 1, wherein said lower casing has a cylindrical portion formed integrally on the lower surface of said lower annular plate portion and having an inside diameter identical to that of the insertion hole.

* * * * *